US010126123B2

(12) United States Patent
Harrison et al.

(10) Patent No.: US 10,126,123 B2
(45) Date of Patent: Nov. 13, 2018

(54) SYSTEM AND METHOD FOR TRACKING OBJECTS WITH PROJECTED M-SEQUENCES

(71) Applicant: CARNEGIE MELLON UNIVERSITY, a Pennsylvania Non-Profit Corporation, Pittsburgh, PA (US)

(72) Inventors: Christopher Harrison, Pittsburgh, PA (US); Bo Robert Xiao, Pittsburgh, PA (US); Scott E. Hudson, Pittsburgh, PA (US); Ivan Poupyrev, Sunnyvale, CA (US); Karl D. D. Willis, Millbrae, CA (US)

(73) Assignees: CARNEGIE MELLON UNIVERSITY, Pittsburgh, PA (US); DISNEY ENTERPRISES, INC., Burbank, CA (US)

( * ) Notice: Subject to any disclaimer, the term of this patent is extended or adjusted under 35 U.S.C. 154(b) by 294 days.

(21) Appl. No.: 14/860,496

(22) Filed: Sep. 21, 2015

(65) Prior Publication Data

US 2016/0084960 A1 Mar. 24, 2016

Related U.S. Application Data

(60) Provisional application No. 62/071,309, filed on Sep. 19, 2014.

(51) Int. Cl.
*G01C 3/00* (2006.01)
*G06F 3/0346* (2013.01)
(Continued)

(52) U.S. Cl.
CPC .............. *G01C 3/00* (2013.01); *G01S 5/16* (2013.01); *G06F 3/0304* (2013.01);
(Continued)

(58) Field of Classification Search
CPC . G01C 3/00; G01S 5/16; G01F 3/0317; G01F 3/0304; G01B 11/026
See application file for complete search history.

(56) References Cited

U.S. PATENT DOCUMENTS 5,675,129 A * 10/1997 Burns ................... G06F 3/0317
178/18.01
2003/0223085 A1* 12/2003 Rekimoto .............. G01B 11/00
356/614

(Continued)

OTHER PUBLICATIONS

Bergmann, D. "New approach for automatic surface reconstruction with coded light." In Proc. Remote Sensing and Reconstruction for Three-Dimensional Objects and Scenes. vol. 2572, SPIE, 1995, 2-9.

(Continued)

*Primary Examiner* — Eric L Bolda
(74) *Attorney, Agent, or Firm* — Michael G. Monyok; David G. Oberdick

(57) ABSTRACT

According to embodiments of the present invention are a system and method that use projected structured patterns of light and linear optical sensors for motion tracking. Sensors are capable of recovering two-dimensional location within the projection area, while several sensors can be combined for up to six degrees of freedom tracking. The structure patterns are based on m-sequences, in which any consecutive subsequence of m bits is unique. Both digital and static light sources can be used. The system and method of the present invention enables high-speed, high precision, and low-cost motion tracking for a wide range of applications.

19 Claims, 13 Drawing Sheets

(51) Int. Cl.
  *G06F 3/03* (2006.01)
  *G01S 5/16* (2006.01)
  *G01B 11/02* (2006.01)
(52) U.S. Cl.
  CPC .......... *G06F 3/0317* (2013.01); *G06F 3/0346* (2013.01); *G01B 11/026* (2013.01)

(56) References Cited

U.S. PATENT DOCUMENTS

| | | | | |
|---|---|---|---|---|
| 2004/0243563 | A1* | 12/2004 | Heiner | H04L 29/06 |
| 2012/0194486 | A1* | 8/2012 | Kajitani | G06F 3/03545 |
| | | | | 345/179 |
| 2013/0242090 | A1* | 9/2013 | Yoshikawa | G01B 11/026 |
| | | | | 348/136 |
| 2016/0000516 | A1* | 1/2016 | Cheng | A61B 34/20 |
| | | | | 600/424 |

OTHER PUBLICATIONS

Buckley, E. "Eye-safety analysis of current laser-based LCOS projection systems." Journal of the Society for Information Display 18, No. 12 (2010): 1051-1057.
Cao, X. et al. "Multi-user interaction using handheld projectors." In Proceedings of the 20th annual ACM symposium on User interface software and technology, pp. 43-52. ACM, 2007.
Casiez, G. et al. "1€ filter: a simple speed-based low-pass filter for noisy input in interactive systems." In Proceedings of the SIGCHI Conference on Human Factors in Computing Systems, pp. 2527-2530. ACM, 2012.
Celozzi, C. et al. "A 6-DOF ARTag-based tracking system." IEEE Transactions on Consumer Electronics 56, No. 1 (2010).
Chan, Li-Wei et al. "Enabling beyond-surface interactions for interactive surface with an invisible projection." In Proceedings of the 23nd annual ACM symposium on User interface software and technology, pp. 263-272. ACM, 2010.
Davison, A.J. et al. "MonoSLAM: Real-time single camera SLAM." IEEE transactions on pattern analysis and machine intelligence 29, No. 6 (2007): 1052-1067.
Dourish, Paul. "Where the action is: the foundations of embodied interaction." MIT press, 2004.
Grundhöfer, A. et al. "Dynamic adaptation of projected imperceptible codes." In Proceedings of the 2007 6th IEEE and ACM International Symposium on Mixed and Augmented Reality, pp. 1-10. IEEE Computer Society, 2007.
Harrison, C. et al. "OmniTouch: wearable multitouch interaction everywhere." In Proceedings of the 24th annual ACM symposium on User interface software and technology, pp. 441-450. ACM, 2011.
Hartley, R. et al. "Multiple view geometry in computer vision." Cambridge university press, 2003.
Heo, S. et al. "IrCube tracker: an optical 6-DOF tracker based on LED directivity." In Proceedings of the 24th annual ACM symposium on User interface software and technology, pp. 577-586. ACM, 2011.
Kato, H. et al. "Marker tracking and hmd calibration for a video-based augmented reality conferencing system." in Augmented Reality, 1999.(IWAR'99) Proceedings. 2nd IEEE and ACM International Workshop on, pp. 85-94. IEEE, 1999.
Kawasaki, H. et al. "Dynamic scene shape reconstruction using a single structured light pattern." In Computer Vision and Pattern Recognition, 2008. CVPR 2008. IEEE Conference on, pp. 1-8. IEEE, 2008.
Köhler, M. et al. "Tracksense: infrastructure free precise indoor positioning using projected patterns." In International Conference on Pervasive Computing, pp. 334-350. Springer, Berlin, Heidelberg, 2007.
Lee, J. et al. "Hybrid infrared and visible light projection for location tracking." In Proceedings of the 20th annual ACM symposium on User interface software and technology, pp. 57-60. ACM, 2007.
MacWilliams, F. J. et al. "Pseudo-random sequences and arrays." Proceedings of the IEEE 64, No. 12 (1976): 1715-1729.
Mohan, A. et al. "Bokode: imperceptible visual tags for camera based interaction from a distance." In ACM Transactions on Graphics (TOG), vol. 28, No. 3, p. 98. ACM, 2009.
Molyneaux, D. et al. "Interactive environment-aware handheld projectors for pervasive computing spaces." Pervasive Computing (2012): 197-215.
Morita, H. et al. "Reconstruction of surfaces of 3-d objects by m-array pattern projection method." In Computer Vision., Second International Conference on, pp. 468-473. IEEE, 1988.
Ng, A. et al. "Designing for low-latency direct-touch input." In Proceedings of the 25th annual ACM symposium on User interface software and technology, pp. 453-464. ACM, 2012.
Pages, J. et al. "A new optimised de bruijn coding strategy for structured light patterns." In Pattern Recognition, 2004. ICPR 2004. Proceedings of the 17th International Conference on, vol. 4, pp. 284-287. IEEE, 2004.
Pollefeys, M. et al. "Visual modeling with a hand-held camera." International Journal of Computer Vision 59, No. 3 (2004): 207-232.
Raskar, R. et al. "RFIG lamps: interacting with a self-describing world via photosensing wireless tags and projectors." In ACM Transactions on Graphics (TOG), vol. 23, No. 3, pp. 406-415. ACM, 2004.
Raskar, R. et al. "Prakash: lighting aware motion capture using photosensing markers and multiplexed illuminators." In ACM Transactions on Graphics (TOG), vol. 26, No. 3, p. 36. ACM, 2007.
Raskar, R. et al. "The office of the future: A unified approach to image-based modeling and spatially immersive displays." In Proceedings of the 25th annual conference on Computer graphics and interactive techniques, pp. 179-188. ACM, 1998.
Saito, S. et al. "Indoor marker-based localization using coded seamless pattern for interior decoration." In Virtual Reality Conference, 2007. VR'07. IEEE, pp. 67-74. IEEE, 2007.
Salvi, J. et al. "A state of the art in structured light patterns for surface profilometry." Pattern recognition 43, No. 8 (2010): 2666-2680.
Schmidt, D. et al. "PICOntrol: using a handheld projector for direct control of physical devices through visible light." In Proceedings of the 25th annual ACM symposium on User interface software and technology, pp. 379-388. ACM, 2012.
Shiratori, T. et al. "Motion capture from body-mounted cameras." in ACM Transactions on Graphics (TOG), vol. 30, No. 4, p. 31. ACM, 2011.
Welch, G. et al. "Motion tracking: No silver bullet, but a respectable arsenal" IEEE Computer graphics and Applications 22, No. 6 (2002): 24-38.
Welch, G. et al. "The HiBall tracker: High-performance wide-area tracking for virtual and augmented environments." In Proceedings of the ACM symposium on Virtual reality software and technology, pp. 1-10. ACM, 1999.
Wienss, C. et al. "Sceptre: an infrared laser tracking system for virtual environments." In Proceedings of the ACM symposium on Virtual reality software and technology, pp. 45-50. ACM, 2006.
Willis, K.D.D. et al. "SideBySide: ad-hoc multi-user interaction with handheld projectors." In Proceedings of the 24th annual ACM symposium on User interface software and technology, pp. 431-440. ACM, 2011.
Willis, K.D.D. et al. "HideOut: mobile projector interaction with tangible objects and surfaces." In Proceedings of the 7th International Conference on Tangible, Embedded and Embodied Interaction, pp. 331-338. ACM, 2013.
Woltring, H. J. "New possibilities for human motion studies by real-time light spot position measurement." Biotelemetry 1, No. 3 (1973): 132-146.

(56) References Cited

OTHER PUBLICATIONS

Zizka, J. et al. "SpeckleSense: fast, precise, low-cost and compact motion sensing using laser speckle." In Proceedings of the 24th annual ACM symposium on User interface software and technology, pp. 489-498. ACM, 2011.

* cited by examiner

SYSTEM AND METHOD FOR TRACKING OBJECTS WITH PROJECTED M-SEQUENCES

CROSS-REFERENCE TO RELATED APPLICATIONS

This application claims the benefit under 35 U.S.C. § 119 of Provisional Application No. 62/071,309, filed Sep. 19, 2014, which is incorporated herein by reference.

STATEMENT REGARDING FEDERALLY SPONSORED RESEARCH

This invention was made with government support under NSF Number IIS-1217929. The government has certain rights in this invention.

BACKGROUND OF THE INVENTION

The invention relates generally to the use of structured patterns of light for motion tracking of objects. More specifically, the invention relates to a system and method where projected structured patterns of light based on m-sequences are used in combination with an optical sensor to locate and track an object.

Motion tracking is a fundamental component of almost all interactive systems. The rapidly growing area of embodied and gestural interaction underlines the continuing importance of accurate, fast, and affordable motion tracking technology. Numerous approaches have been developed to sense and track motion using mechanical, inertial, acoustic, magnetic, and radio-based sensing techniques.

In one example of an existing tracking system, natural features in a scene can be tracked using standard cameras to recover three-dimensional information from a series of two-dimensional images, for example, by using Structure from Motion (SfM). When combined with Simultaneous Localization and Mapping (SLAM), camera pose can be estimated within a dynamically constructed map of the environment. Although powerful, natural feature tracking techniques are computationally expensive and challenging to implement in embedded systems and mobile devices.

In another example, marker-based motion tracking systems instrument objects and the environment with physical markers to aid the tracking process. A camera is used to detect the markers in the scene and estimate the location and, in some systems, the orientation of the marker. Marker-based systems can utilize printed two-dimensional barcodes, retro-reflective or light-emitting points, hidden patterns or printed patterns. While some of these systems offer low latency, high precision tracking, commercial marker-based systems typically cost thousands of dollars.

With projected marker tracking, marker patterns are dynamically projected onto surfaces in the environment for use with handheld devices, interactive tabletops, and augmented displays. The projected markers can be identified and tracked using standard marker-based tracking techniques. These systems typically hide the obtrusive appearance of the projected markers using near-infrared projection or temporal multiplexing. Latency can be an issue with these types of systems because a camera is used to sense the projected marker.

Structured light tracking is another example where projecting geometric patterns on the environment, i.e. structured light, allows a camera to infer information about the structure and properties of the environment. A number of structured light schemes have been developed for three-dimension object digitization and recognition including M-arrays, de Bruijn sequences, bilinear de Bruijn sequences, time-multiplexed grey codes, and others. Structured light has been used for interaction to simultaneously capture and display on objects and people, to localize mobile devices, and in a range of interaction scenarios using structured light depth cameras. As structured light systems typically use a camera-projector pair, latency is a common and non-trivial issue.

In yet another example, with projector/sensor tracking systems, projecting light directly onto an optical sensor enables spatial information to be directly communicated between projector and sensor. The dominant approach has been time-multiplexed projection. For example, in one system of this type, spatial information is temporally communicated to photodiodes embedded in objects using LED clusters. In another system, a specially-modified projector is used to project temporal grey code pattern within a monochrome display using an imperceptible change in modulation; sensors within the projection field then read the grey code patterns. With a gray pattern system, the projection is inherently time-multiplexed. In another one of these systems, the visible output of a projector is modulated to transmit time-multiplexed codes onto sensors within the projection field, which activate interactive functions upon detection of an appropriate code.

While existing tracking systems can offer precise tracking in some instances, they suffer from high cost, high latency, or complex designs. Therefore a need exists for an inexpensive motion tracking system that offers low latency and high precision in a relatively simple system.

BRIEF SUMMARY OF THE INVENTION

According to embodiments of the present disclosure is a system and method for projecting a structured light pattern, based on an m-sequence, onto a sensor to allow tracking of an object. The sensor can be mounted to the object, with the projector remaining stationary, or vice versa. A processor analyzes the data signal produced by the sensor and determines which portion of the pattern is falling on the optical sensor. Based on the non-repeating nature of the m-sequence, the system is then able to determine the position of the sensor within the projected light field. A single sensor allows tracking in one direction, while multiple sensors can be used to allow six degree of freedom tracking. In one particular embodiment, a focus-free dynamic digital projector utilizing LCOS laser projection, such as a pico projector, is used to project the pattern.

With LCOS laser projection, a full, single-color image is projected at any instant in time. The 'full-frame' property allows the projected m-sequence to be rapidly tracked. In one particular embodiment, the system offers extremely high frame rate with low latency: peak speeds over 1000 tracking frames per second (FPS) delivered ~2.5 ms behind real time. Moreover, the components of the system are relatively small and low powered (<1 watt), enabling integration into mobile devices and presenting a low cost solution. Finally, the system and method of the present invention are extremely precise: capable of providing sub-millimeter and sub-degree translational and rotational accuracy respectively.

DETAILED DESCRIPTION OF THE INVENTION

Figure 1:
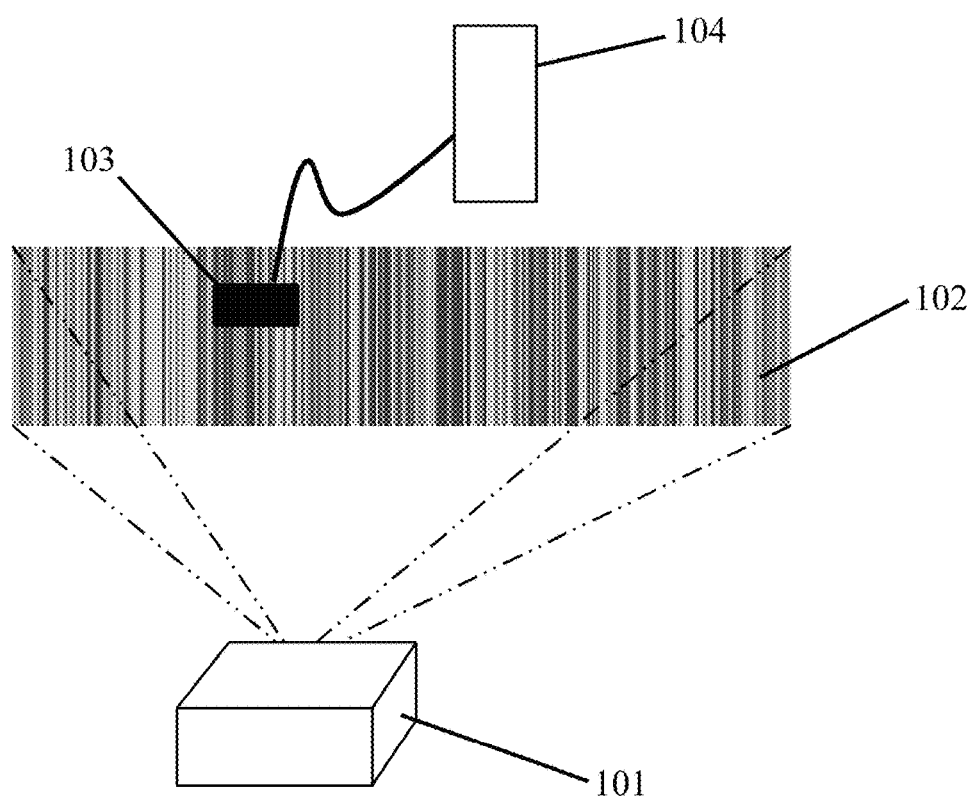
FIG. 1 shows the system, according to one embodiment, projecting a structured light pattern directly onto an optical sensor.

Embodiments of the present invention and its advantages are best understood by referring to the figures. Referring to FIG. 1, the system comprises a projector 101 for emitting a structured light pattern 102 onto a sensor 103 and a processor 104 for analyzing data from the sensor 103.

The structured light pattern 102 is a specific pattern known as a binary m-sequence. M-sequences have a special property: every consecutive subsequence of m-bits within an m-sequence is unique. For example, in the following m-sequence the 7-bit subsequence—1010001—appears exactly once:

00001000110111011000010110110101001111101011
0011001010111001100011
1010001010000110010 01011100010011

In fact, any consecutive seven digits are guaranteed to only appear once. To use with a projector 101, the m-sequence is converted to a structured light pattern 102 in the preferred embodiment by emitting 1's as lines of light and 0's as dark lines (no light) from the projector 101. However, any color combination for 1's and 0's distinguishable by a sensor 103 can be used.

The projector 101 can be any source capable of emitting a static or dynamic image. Static projectors 101 use a light source 501, optional focusing optics 502, and an image source 503 to emit a fixed pattern 102. With laser light sources 501, focusing optics 502 may not be necessary. Due to their simple design, static projectors 101 can be compact, inexpensive, and lightweight.

Figure 5:
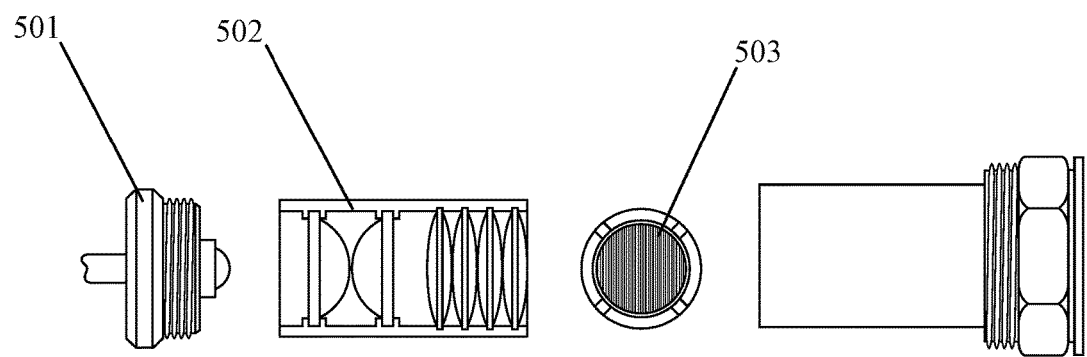
FIG. 5 is an exploded view of a static projector.
Figure 6A:
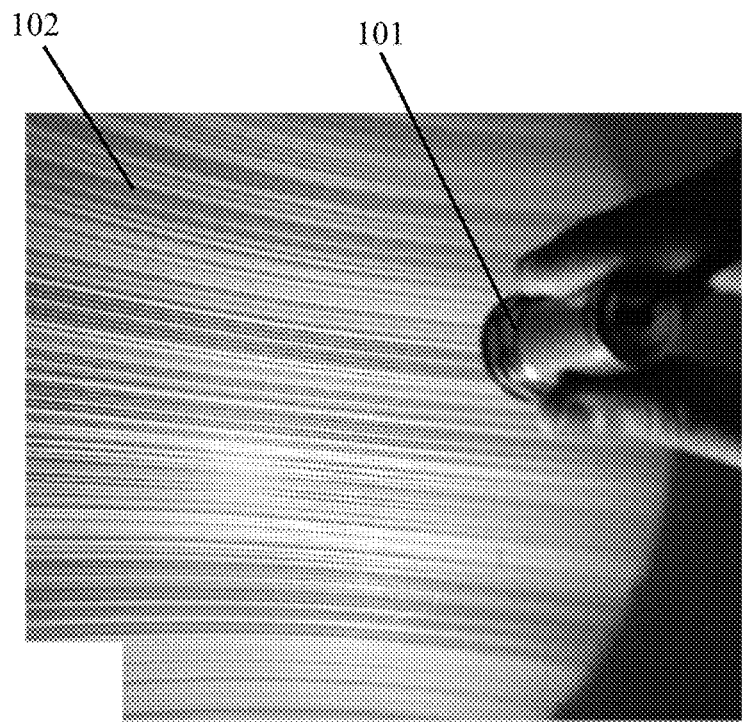
FIG. 6A depicts a one-dimensional m-sequence projected onto a wall with a static projector.

In one embodiment, a static projector 101 is comprised of LED light sources 501, off-the-shelf focusing optics 502, and high-resolution films as image sources 503. In this particular embodiment, which is depicted in FIG. 5, the m-sequence can be rendered onto black and white film at high resolution (8000 dpi, for example) and the film is inserted into an off-the-shelf car door "gobo" projector measuring 4.6 cm long by 2.2 cm in diameter. FIG. 6A shows a pattern 102 emitted by a projector 101 of the type depicted in FIG. 5.

LEDs or lasers can be used as the light source 501 in the static projector 101. If a laser is used, a suitable m-sequence diffraction grating or other image source 503 would have to be used.

Figure 6B:
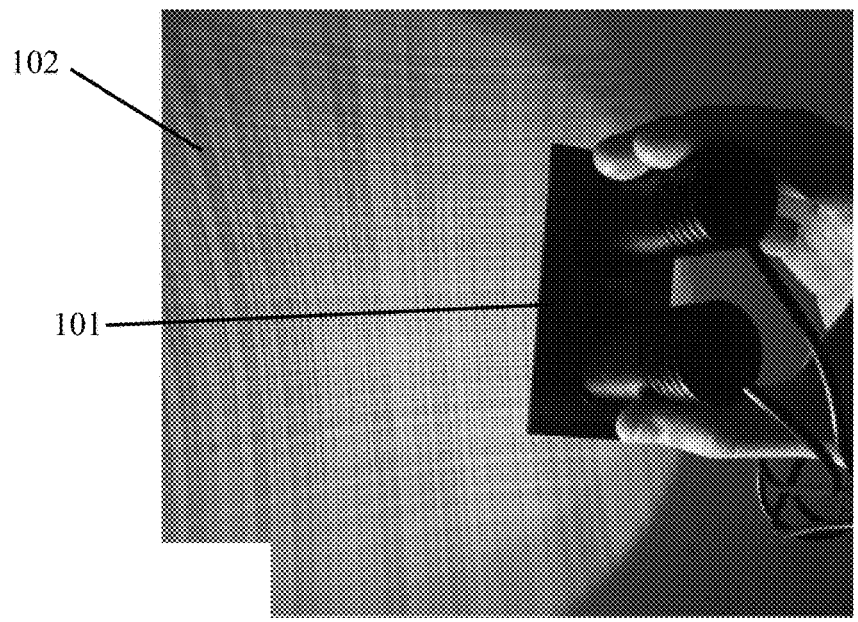
FIG. 6B shows a two axis static projector projecting orthogonal m-sequences onto a wall.
Figure 6C:
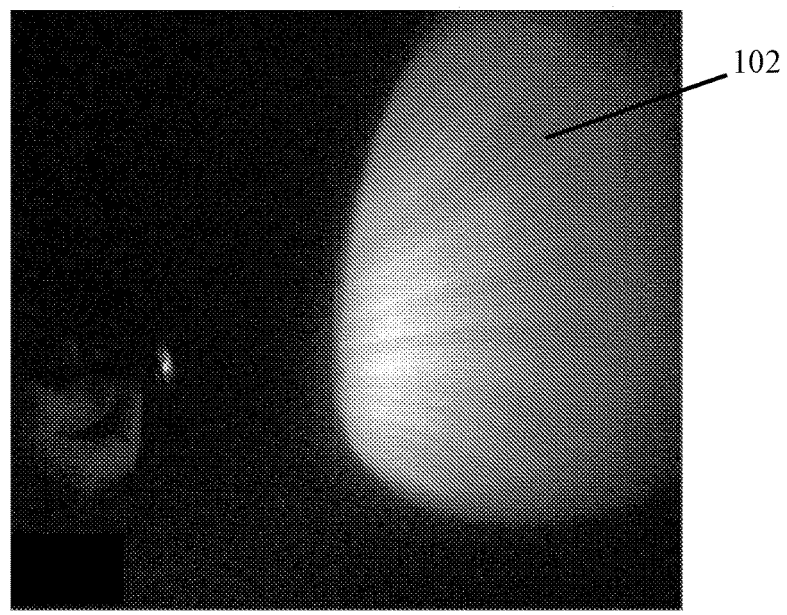
FIG. 6C is a view of an m-sequence projected in infrared.

A visible light or invisible infrared LED can be used to power the projection. When projecting in infrared, special consideration needs to be given to the film's infrared transmission properties. Because many films are designed to be transmissive to infrared, short wavelength 730 nm infrared LEDs are used. An example of an infrared projection is shown in FIG. 6C.

Figure 7:
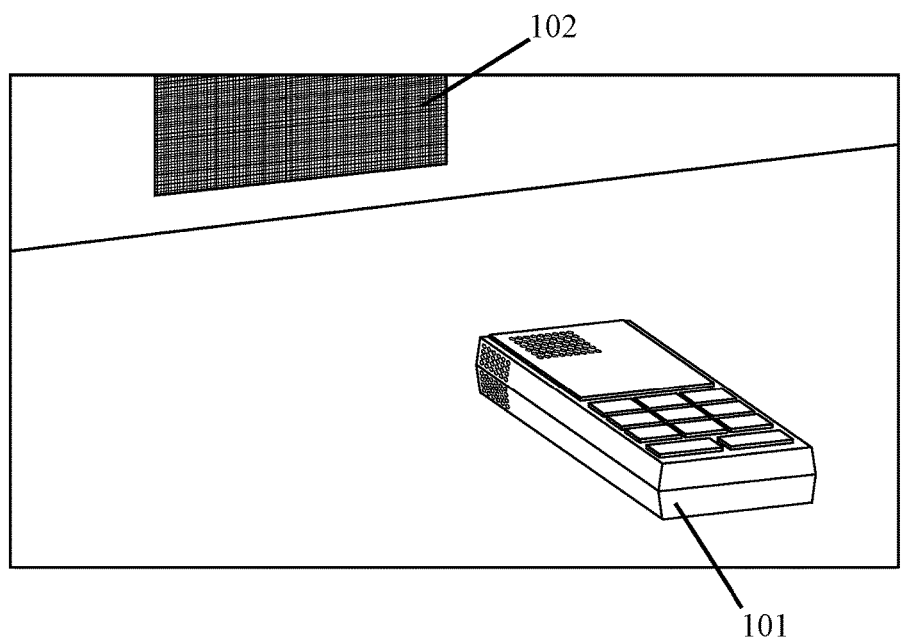
FIG. 7 shows an AAXA Technologies L1 projector emitting a focus-free image using an LCOS panel and laser light.

In the preferred embodiment, the projector 101 is LCOS laser projector providing an in-focus image at all distances. An example of this type of projector is the L1 model projector manufactured by AAXA Technologies (as shown in FIG. 7), which emits time-multiplexed RGBG images at 800×600 resolution. The projection artifact caused by the multiplexing can be used as an advantage by displaying an X-axis m-sequence in one color channel, and a Y-axis m-sequence in another color channel. By temporally multiplexing orthogonal m-sequences, cross-talk between the projected axes is eliminated. In an alternative embodiment, a two-dimensional m-sequence projector 101 is built using a pair of static projectors 101, as shown in FIG. 6B.

Figure 3:
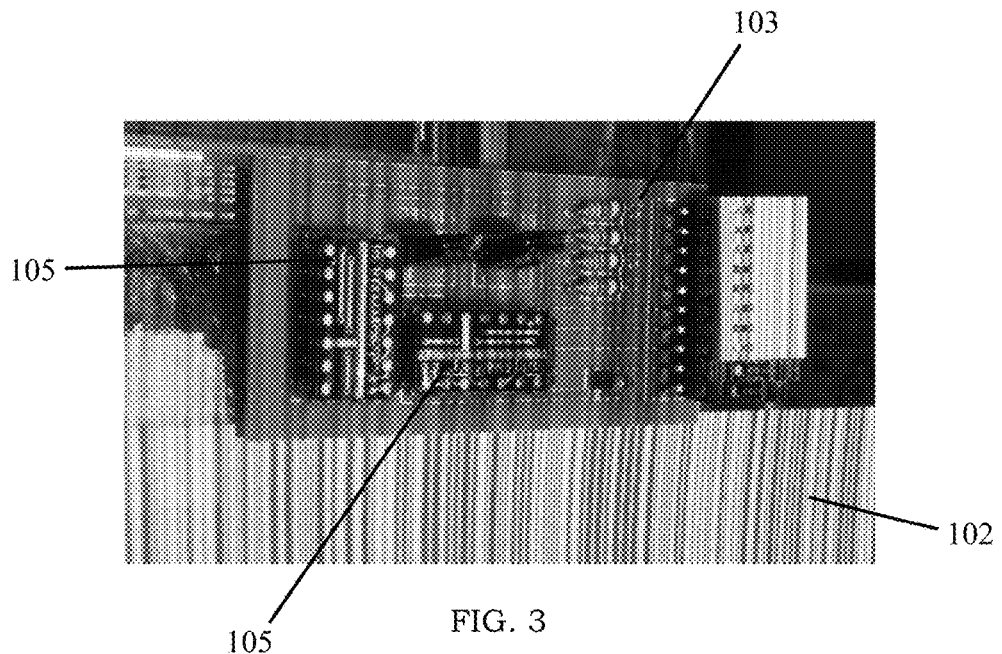
FIG. 3 presents a one-dimensional m-sequence projected onto a sensor, analogous to the setup illustrated in FIG. 1.

The sensor 103 is an optical sensor capable of outputting data based on the light received on its surface. As will be understood by a person having skill in the art, the system can only track when the sensor 103 is in the projection field. In the preferred embodiment, the sensor 103 uses simple, lens-less, linear optical sensors and operates at a high frame rate. In alternative embodiments, the sensor 103 is comprised of a pair of arrays 105, where a first linear array 105 is arranged orthogonally to a second array 105, as shown in FIG. 3. In one embodiment, the sensor 103 consists of a custom printed circuit board connected to a processor 104, such as a microcontroller. The microcontroller 104 processes sensor data into positional data, which can be used by a separate system for interactive applications.

By way of example, a TSL202R 128×1 linear optical sensor manufactured by AMS is one particular type of sensor 103 that can be used with the system of the present invention. In this example, two linear arrays 105 are mounted perpendicular to each other, forming the sensor 103 as shown in FIG. 3. This configuration enables two-dimensional sensing, with a quadratic reduction in total pixels relative to a two-dimensional camera sensor (e.g., 128×128 pixels vs. 2×128 pixels). With fewer pixels to read, high frame rates can be achieved. The optical sensors 103 are highly responsive to a broad spectrum of light, including infrared.

The processor 104 is a computer, tablet, or other device capable of processing the data from the sensor 103. The communications connection between the sensor 103 and processor 104 can be wired or wireless. Alternatively, the processor 104 can be imbedded in the circuit board containing the sensor 103. By way of example, the processor 104 can comprise an ARM Cortex M3-based 72 MHz Maple Mini board running C software.

Figure 2:
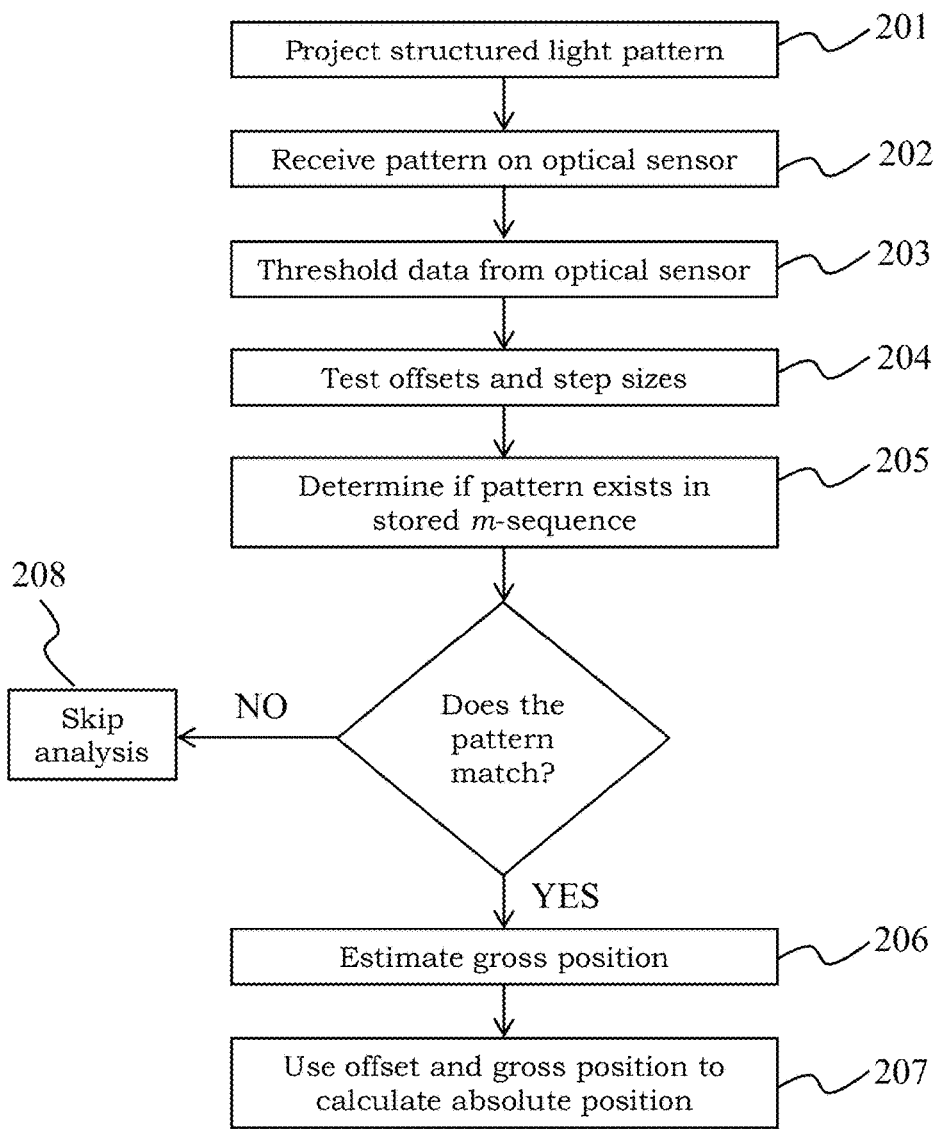
FIG. 2 is a flowchart depicting the method according to one embodiment.

Referring now to FIG. 2, a flowchart depicting the method of tracking an object using a projected structured light pattern, according to a preferred embodiment, is shown. As shown at step 201 of the flowchart, the projector 101 emits the structured light pattern 102. For tracking to occur, a sensor 103 must be located within the projection field. At step 202, the sensor 103 receives the projected structured light pattern 102. Because the sensor 103 occupies only a fraction of the area illuminated by the structured light pattern 102, only a portion of the pattern 102 will be sensed by the sensor 103. In other words, the optical sensor 103 can only see a window of the m-sequence at step 202. In the preferred embodiment, the system is able to locate the sensor if about 20 bits or more of the pattern 102 can be seen by the sensor 103. However, the window size can vary depending on the resolution of the projector 101 and sensor 103.

Figure 4:
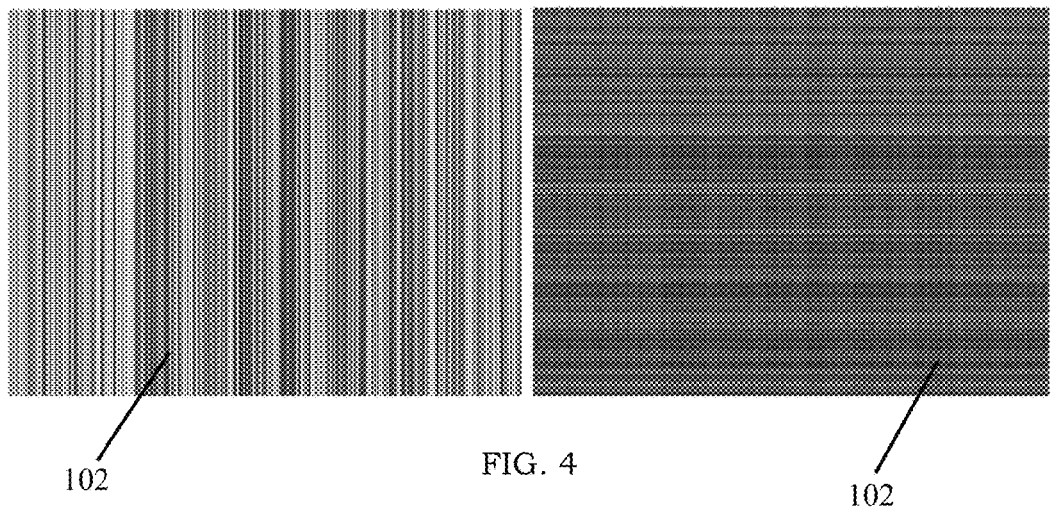
FIG. 4 shows an example of a one-dimensional sequence (Left) and two orthogonal sequences (Right).

With one sensor 103, the system can resolve position in one dimension. In alternative embodiments, the system uses two orthogonal patterns 102 (as shown on the right-side of FIG. 4), which allows a pair of sensors 103 to calculate X and Y positions. Using multiple sensors 103, it is possible to resolve X, Y and Z positions and roll/pitch/yaw rotation— i.e., full six degree-of-freedom (6 DOF) tracking.

Figure 8A:
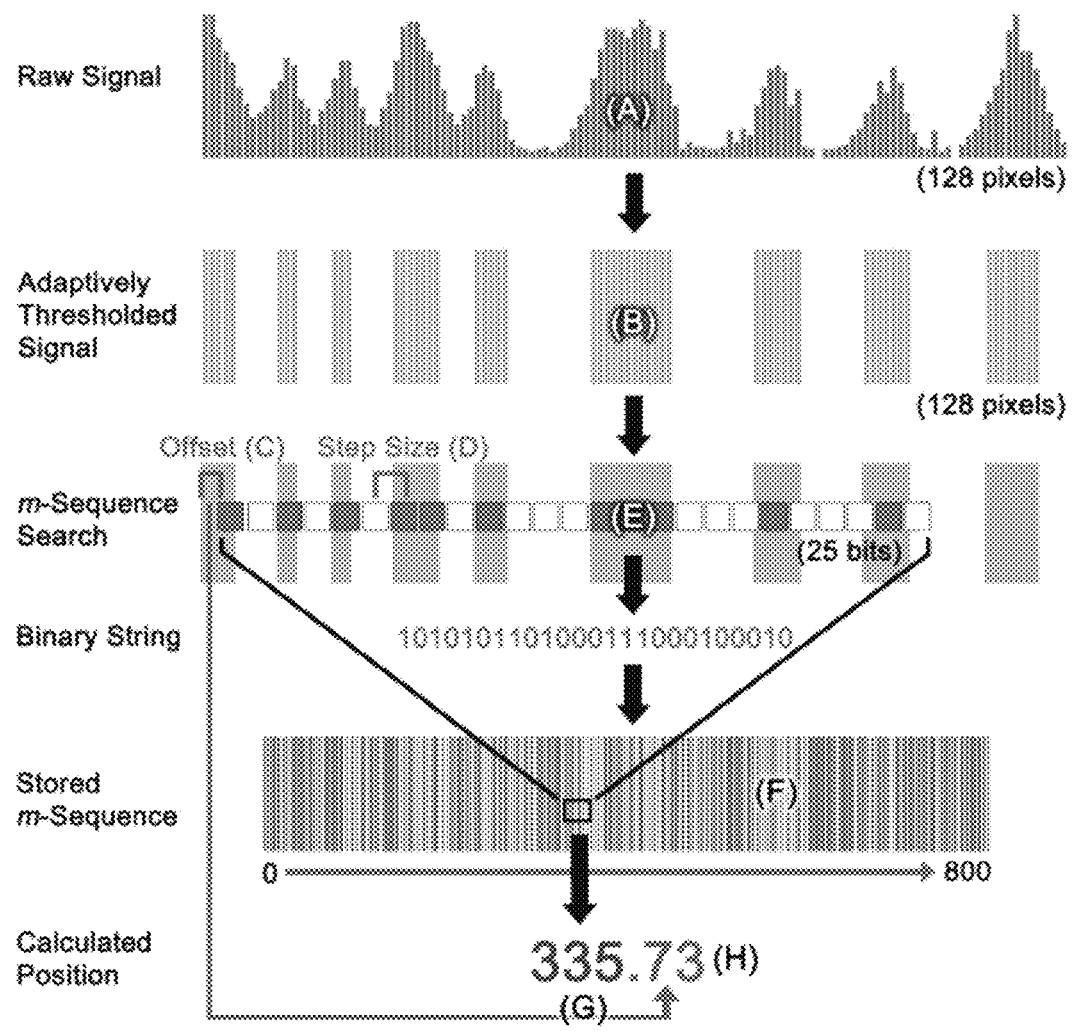
FIG. 8A-8B illustrates the process of transforming a sensor signal and determining position from the projected pattern, according to one embodiment.

Referring again to FIG. 2, the data from the sensor 103 is thresholded at step 203. As will be discussed in greater detail below, during this step, the raw signal from the sensor 103 is adapted for easier processing. An illustration of the thresholded signal can be seen in the second row of FIG. 8A. Next, at step 204, the system tests the offsets and step size of the pattern comprising the thresholded signal. The result of the testing is a binary string. In other words, the light and dark line pattern from the projector 101, as received by the sensor 103, is converted to a series of 1's and 0's.

Figure 8B:
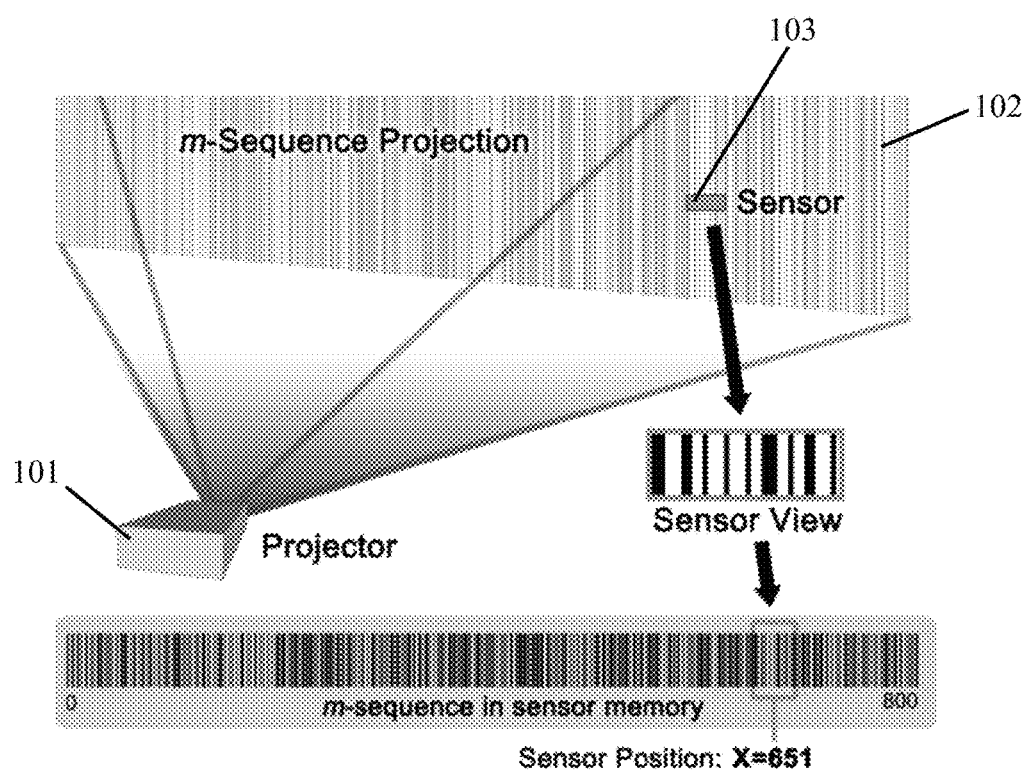

At step 205, the system determines if the binary string matches a pattern in an m-sequence stored in the system. If the binary string matches, the gross position of the sensor is estimated at step 206 by finding the position of the subsequence in the larger m-sequence. The m-sequence forming the structured light pattern 102 is known by the system, thus the system is able to quickly determine the gross position. For example, FIG. 8B shows a particular subsequence being correlated with a position. The offset is then used with the gross position to determine the absolute position of the sensor 103 within the projected light pattern 102 at step 207. Unlike motion tracking systems that determine motion by comparing a differential between a first frame and a second frame, the system and method of the present invention do not suffer from drift (i.e. the accumulation of position errors over time). If the string does not match a pattern in the m-sequence after step 205, the system can retest the offset and step size, apply error correction, or skip the analysis of this particular signal at step 208. Skipping the analysis is particularly useful to improve system performance when time-multiplexed patterns are projected onto multiple sensors 103.

In some embodiments, to improve tracking robustness, m-sequences can be further constrained in several ways. For example, the maximum number of consecutive identical bits (i.e. a run of bits, such as 000) is limited to three and every window, or the portion of the pattern 102 visible to the sensor 103, is required to contain at least one run having a length of exactly one. These requirements assist with accurate recovery of the spatial frequency of the pattern received on the linear sensors 103. Finally, the bit-patterns of different windows are required to differ in at least two places, to ensure that single bit-flips caused by noise could not result in an incorrect identification.

To create m-sequences that fulfill these constraints, a sequential generate-and-test approach is used with backtracking. In one example embodiment, a window size of m=25 is used for an 800-bit sequence suitable for an 800×600 projection resolution. The same approach is used to find two separate 800-bit sequences with no windows in common, opening the possibility of sequence switching as an additional information channel.

The sensor sampling process is initiated by a timer interrupt, which interrupts the main pattern matching process. In one embodiment, it uses analog to digital converters (ADCs) in the processor 104 to sample a pair of linear sensors 103, one ADC per sensor 103 (or one ADC per array 105 in a two-array sensor 103). By initiating both ADCs simultaneously and waiting for them to both return, the system can sample at a very high rate, which can exceed 1 million samples per second. This reduces the time the processor 104 spends in the sampling process and allows for more time to perform signal processing. By using direct memory access (DMA), the speed could be further improved to a theoretical maximum of 5 million samples per second. In one example embodiment of the system, reading both sensors 103 completely takes a total of 101 μs. The sensor data is read into two arrays of integers; because this process may interrupt the pattern matching process, double-buffering is used to ensure data integrity.

Between each sampling burst, the linear optical sensors 103 accumulate the electrical charges from their photodiode array 105. This time period, called the integration time, is controlled by the timer period. Adjusting the integration time is a key parameter in optimizing the system performance. At close range, the integration time should be short to avoid saturating the sensors 103, while at long range, the integration time should be longer to improve sensitivity.

For each linear optical sensor 103, the variance of the analog values generated by the sensor 103 is computed. If this value falls below a certain threshold, the system infers that a pattern is not present, and skips the computation. This happens roughly 50% of the time when using the AAXA L1 projector 101, or similar projectors 101, due to the projector's color time multiplexing. In other words, the pattern aligned with the sensor's orientation is only active half of the time. The quick rejection mechanism allows for more computation time for the other sensor 103, allowing for a higher overall frame rate.

Referring again to FIG. 8A and by way of further detail, the sampled analog values, or raw signals generated by the sensors 103, are adaptively thresholded with a specific window size to produce a binary pixel array. The thresholding algorithm produces a 1 if the analog value under consideration is larger than the mean across a window centered on that value, and otherwise outputs a 0. The window size is adjustable, and constitutes another key parameter for performance optimization purposes. At short range, the window size should be small to accommodate a denser arrangement of bits, while at long range, the window size should be large because fewer bits will fall on the sensor 103.

The pattern falling on the linear sensor 103 consists of a subsequence of the m-sequence. Each bit (projected line) of the subsequence can cover multiple pixels of the sensor 103 and the step size (number of pixels from one bit to the next) varies based on the distance from the projector 101 to the sensor 103. For example, in FIG. 8A, a single unit line falls onto approximately 4 sensor pixels. Furthermore, the offset from the edge of the linear sensor 103 to the start of the first complete bit also varies with the precise position of the projector 101.

Thus, there are two unknown parameters: the offset and the step size. To determine these two parameters, the system runs an exhaustive search algorithm over possible step size and offset parameters. In one embodiment, 16.16 fixed-point arithmetic is used to enable fine-grained search parameters without the overhead of floating-point computations on the processor 104. In one example, step sizes from 2 to 5 pixels are tested in increments of ⅐ of a pixel, and offsets from zero up to the step size in increments of a whole pixel. This results in a total of 63 parameter combinations. For each of these combinations, the thresholded pixel array is sampled to obtain an m-bit integer, which is looked up in a fixed (precompiled) hashtable that maps subsequences to their index in the m-sequence.

If the parameter combination is correct, the lookup should succeed (assuming no sensor 103 or sampling errors occur). Note that this lookup is performed for every parameter combination. In the preferred embodiment, with a 800-bit 25-sequence, there are 225 possible 25-bit subsequences and less than 210 valid sequences, so the chances of a false-positive lookup are less than one in 215. If a lookup succeeds, the processor 104 stores the looked-up index (i.e., the linear position) and the step size and offset parameters.

The offset from the sensor's edge to the start of the first complete bit offers a way to compute the projector's position with sub-unit accuracy. If the pattern 102 moves by a single pixel on the sensor 103, the offset will change by one pixel even if the looked-up m-sequence index remains the same. By dividing the offset by the step size, a fraction of a position unit is obtained, which can be added to the position to obtain a higher-precision position estimate.

In one embodiment, the processor 104 is a laptop computer running software written in C++. The software causes the sensor 103 to be continually polled by a background thread that pushes received updates into a queue. With multiple connected sensors 103, each sensor 103 gets a background thread; the threads are synchronized to ensure that the data is up-to-date. Interactive applications query the queues every frame to retrieve the most recent data points. In the case of multiple sensors 103, a code library provides methods for estimating and filtering the 2 DOF, 4 DOF and 6 DOF positions.

With a sensor 103 with two linear arrays 105, an X/Y projected position can be resolved. These two degrees of freedom can be used in two ways. First, if the projector 101 is held still and not translated, the X/Y positions landing on the sensor 103 can be interpreted as two rotational degrees (pitch and yaw), as seen in the sword demonstration described later and shown in FIG. 14. Alternatively, by translating the sensor 103 without changing the orientation of the projector 101 or distance to the sensor plane, the X/Y positions are interpreted as translations within the projector's plane and can be translated to X/Y screen-space coordinates, as is done in the spray painting demo described later and shown in FIG. 12.

With two sensors 103 (each having two arrays 105), it is possible to track four degrees of freedom: the X/Y center of the tracked points, the angle of the line joining the points relative to the horizontal, and the distance between the points. The inverse of the distance between the points can be used to calculate the approximate distance from the projector 101 to the sensors 103.

Six degrees of freedom—three spatial dimensions and three rotational Dimensions—can be tracked using three sensors 103 (each having a pair of orthogonally oriented arrays 105). However, for robustness, in one embodiment, four sensors 103 are used to provide an over-determined system. Solving for the six degrees of freedom amounts to solving for a three-dimension (4×4) projection matrix which projects the three-dimensional positions of the four sensors 103 onto the sensed two-dimension positions within the projector's projected pattern 102. This treatment ignores camera distortion parameters (intrinsic parameters).

Figure 19:
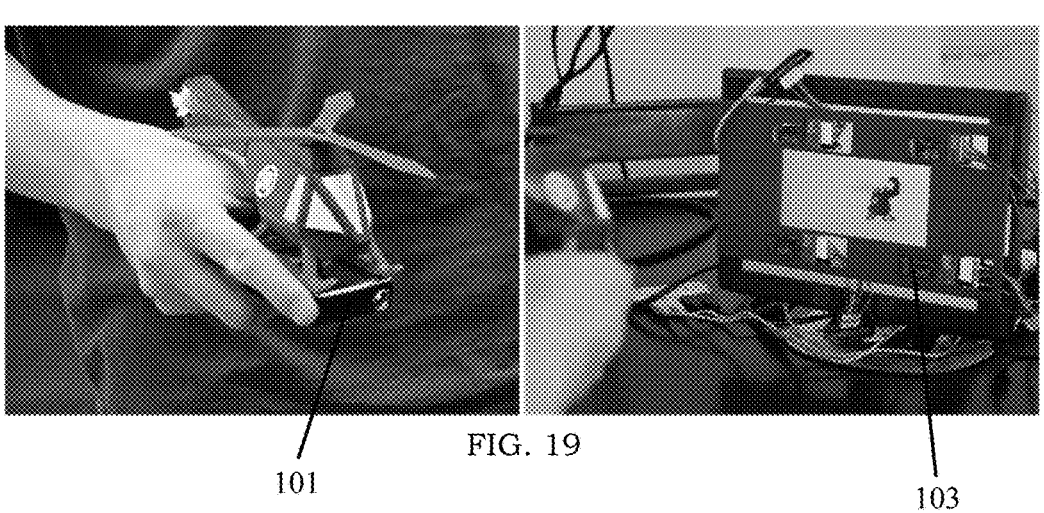
FIG. 19 is yet another example embodiment in which a projector-augmented helicopter model is used to control an on-screen helicopter with six degrees of freedom.

To reduce the number of independent variables in the projection matrix, several variables were calibrated and fixed. In one embodiment, four sensors 103 are arranged in a custom-built, planar mount with tight tolerances (<1 mm). This arrangement is suitable for affixing sensors 103 to the corners of a computer display, such as the implementation shown in FIG. 19. The projector's vertical and horizontal throw is calculated precisely to fix the projection matrix's scaling parameters. The projection matrix then becomes P=STR, where S is the calibrated standard projection matrix (derived from the projector's throw and aspect ratio), T is a translation matrix, and R is a 3D rotation matrix. Because the linear array 105 in each sensor 103 is slightly offset, a set of four pairs of equations is outputted, one per sensor 103: $(Pp_x)x=q_x$, $(Pp_y)y=q_y$ where $p_x$ and $p_y$ are the 3D positions of the starting end of the x and y linear sensors 103, $(q_x, q_y)$ is the 2D tracked position reported by the sensor 103, and $(P)x$, $(P)y$ denote the x/y coordinates of P.

With these eight equations and tracked positions, Gauss-Newton iteration is performed to find a solution which minimizes the total squared error $\Sigma\|(Pp_x)x-q_x\|2+\|(Pp_y)_y-q_y\lambda 2$, also known as the total squared reprojection error. This yields estimates for the six degrees of freedom. Finally, these estimates are smoothed with a 1 € filter to reduce jitter in the estimates during rapid movement.

In one example, the implementation can automatically vary sensing parameters (integration time and adaptive threshold size) to achieve optimal performance over a wide range of distances and lighting conditions. Such automatic adaptation can be informed by experimental evidence, parameter search, and tabular lookup methods.

Figure 9:
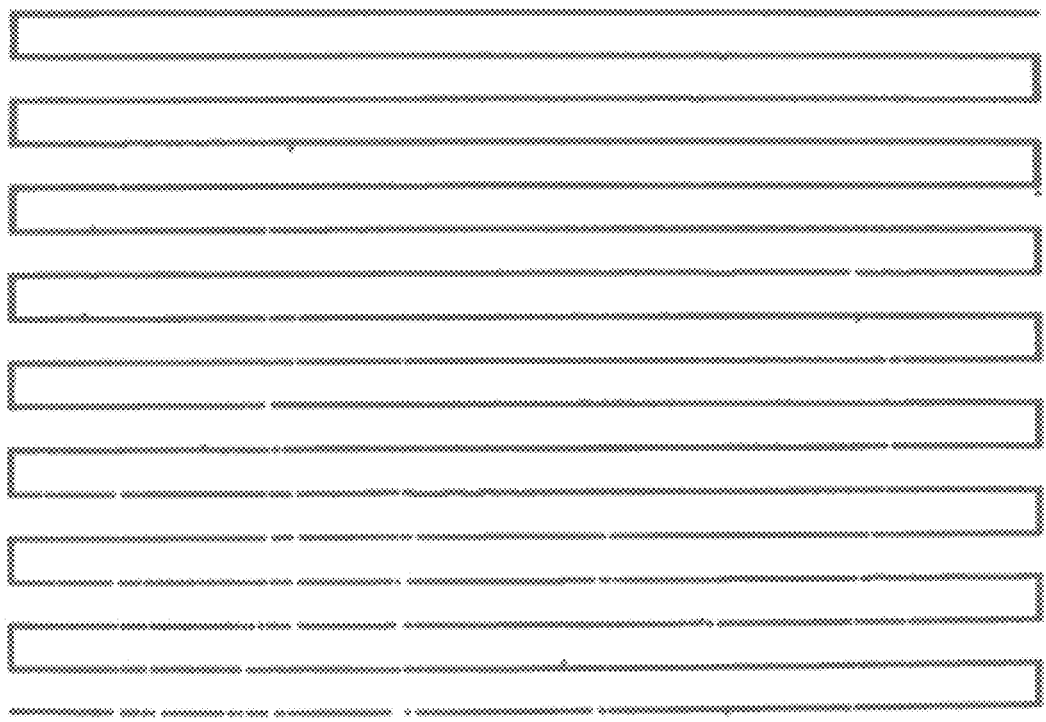
FIG. 9 shows points tracked and recorded by sensors during a raster pattern scan.

As an example of the performance of the system according to one embodiment, a sensor 103 was attached onto a commercial grade, two-axis CNC platform, having a step size of 1 mil (0.0254 mm), which allowed evaluation of the spatial accuracy of the system. The projector 101 was mounted above the sensor plane and configured to emit the standard m-sequence structured light pattern 102. The CNC platform was instructed to trace a 1.5 cm raster pattern. This took 136.0 seconds, during which time the sensor 103 continuously collected 109,363 position values (an average of 804 tracking FPS). The raw data is plotted in FIG. 9.

Figure 10:
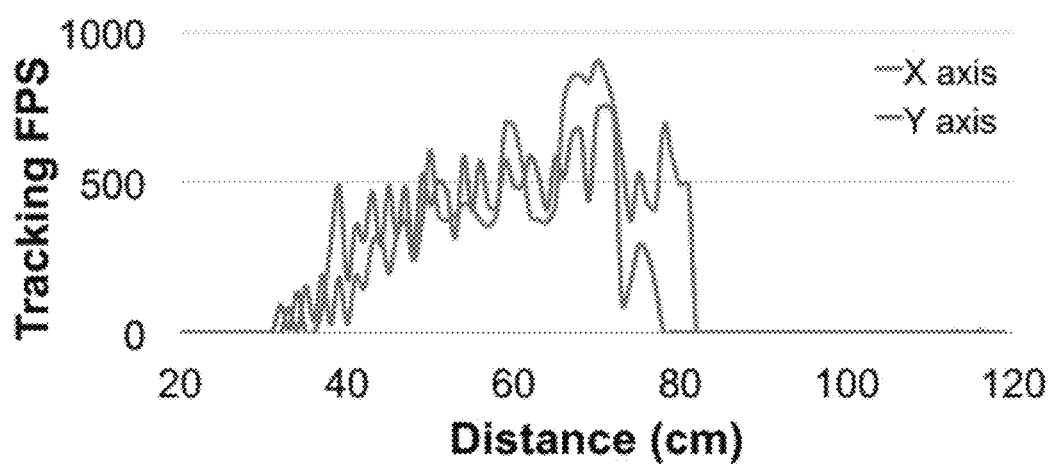
FIG. 10 is a graph depicting a system tracking response rate for two different axes at varying distances between sensor and projector.
Figure 11:
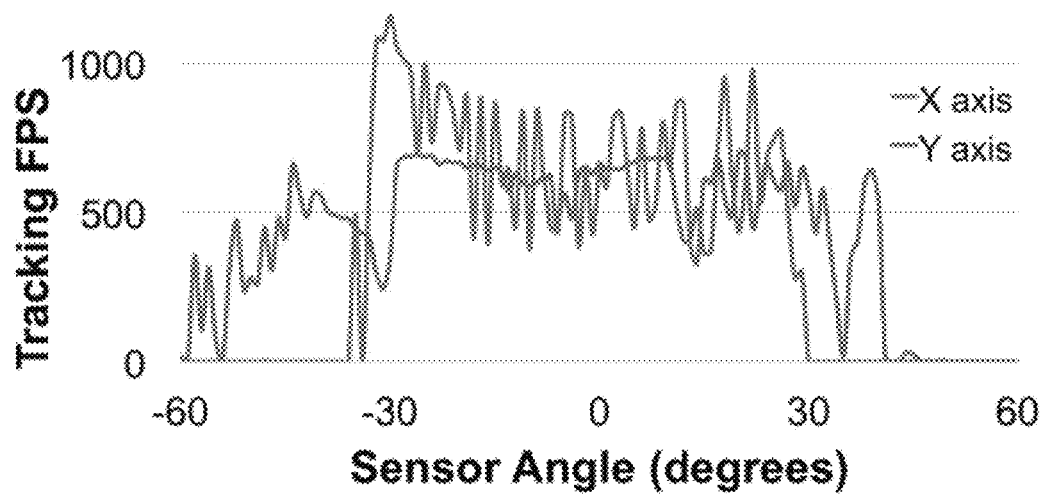
FIG. 11 is a graph showing the system tracking response rate for each axis at varying angles between sensor and projector.

Similarly, to evaluate the tracking frame rate performance of an embodiment of the system at various projector-sensor distances, the CNC platform was used to move the projector 101 away from the sensor by increments of 1.0 cm. At each stop, the control program recorded the values streaming from the sensor 103 for one second. FIG. 10 shows the number of X-axis and Y-axis tracking frames obtained in one second as a function of distance. Note that the frame rates in FIGS. 10 and 11 are ½ maximum due to temporal multiplexing of the projector 101.

In addition, the tracking frame rate of the system is evaluated under three rotational conditions: sensor rotation, projector pitch, and projector yaw. In each condition, the rotating component is affixed to a rotary table with a step of 1/80°. In the first condition, the sensor 103 was rotated on the platform while the projector 101 remained fixed. The sensor 103 was oriented so that the Y-axis linear sensor 103 was perpendicular to the table, and the X-axis linear sensor 103 was parallel to the rotating surface. The results, summarized in FIG. 11, show that the perpendicular Y-axis sensor picked up frames over a wide range of angles (from −60° to 40°), whereas the X-axis sensor's range was slightly more limited (−35° to 30°). However, the performance parameters can vary depending on the type of projector 101 and sensors 103 used.

In the second and third conditions, the projector 101 is mounted to the rotary table, keeping the sensor 103 fixed. The sensor 103 is observed to pick up tracking frames at near maximum speed as soon as the edge of the projection covered the sensor 103, and so it is concluded that the field of view in this case is constrained only by the projector 101.

The total system performance is affected by latency at multiple levels. With a time-multiplexed image, only one coordinate (X or Y) is tracked at any given instant of time. Thus, the average latency to obtain sensor reads on both coordinates is equal to half the time spent displaying a single color frame, or around 2 ms (0.5/240 s) for an LCOS laser projector 101.

The tracker's sensor latency due to the integration time is around 440 µs on average. Processing the sample takes an average of 1250 µs for the processor 104 used in this example, so the average processing latency is 1900 µs (half of the time to process the previous sample, plus the time to process the current sample). Overall, the input latency from the system is around 2600 µs (2.6 ms), which is minimal enough to provide a fluid interaction when used with interactive systems. By comparison, other sensing technologies such as the Microsoft Kinect operate at much lower frame rates (e.g., 30 FPS), resulting in noticeable input delays.

During the tracking accuracy analysis described above, around 7500 tracking frames belonging to the high-error trials were discarded. From this, the error rate is inferred to be at most 1 in 750 frames. During the raster pattern test, 50 erroneous positions were identified by a post-hoc analysis of the data. This is an error rate of 1 in 2000 frames. Thus, the true error rate lies between 0.05% and 0.13% of all frames.

The power consumption of the sensor 103, including processor 104, is about 55 mA at 5 V, or around 275 mW. Power consumption can be reduced with microprocessor power optimizations and low-power sensor components.

FIGS. 12-19 show examples of applications demonstrating the capabilities of the system. In these examples, the sensor 103 can be held or worn by the user and the projector 101 is mounted in the environment (FIGS. 12, 15, 16, 18) or vice versa (FIGS. 13, 14, 17, 19). As both the sensors 103 and projector 101 can be made lightweight and portable, either approach is viable for real-time tracking. The number of sensors 103 used determines the degrees of freedom possible for tracking.

Figure 12:
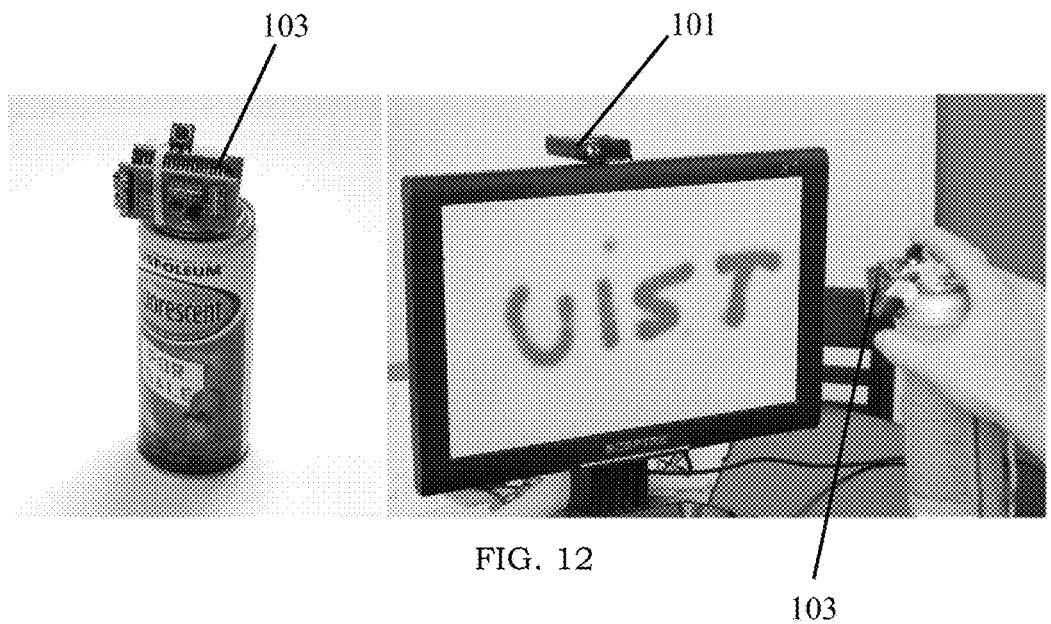
FIG. 12 illustrates a digital spray-painting example implementation, according to one system embodiment.

In the example depicted in FIG. 12, an off-the-shelf spray paint can is modified, replacing the paint nozzle with a sensor 103. A button was provided to spray digital paint onto a computer monitor by toggling the transmission of tracking frames. The projector 101 was mounted to the top of the monitor, providing a two-dimension tracking volume in front of the display.

Figure 13:
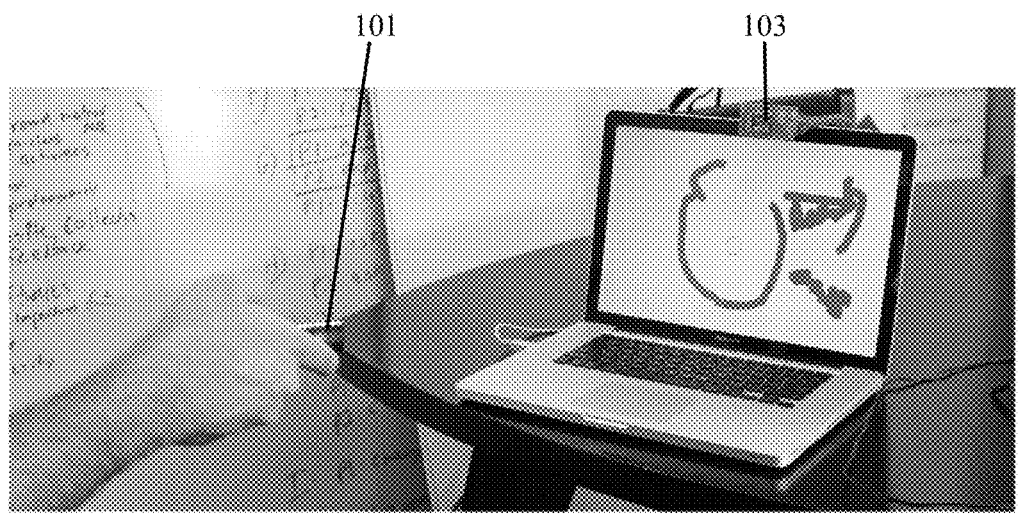
FIG. 13 shows an example of a painting application.

In another example, as shown in FIG. 13, a user manipulates the projector 101 much like a laser pointer, controlling a cursor on the laptop screen by translating or rotating. Buttons on the projector 101 allowed the user to toggle between three different m-sequence patterns which had no m-bit subsequences in common. The system was aware of all three patterns, so in addition to being able to compute its X/Y position within the projected pattern 102, it was also able to know what m-sequence was active. In one example, these three patterns are bound to a pen, eraser and cursor tool, enabling a basic, free-space painting application.

Figure 14:
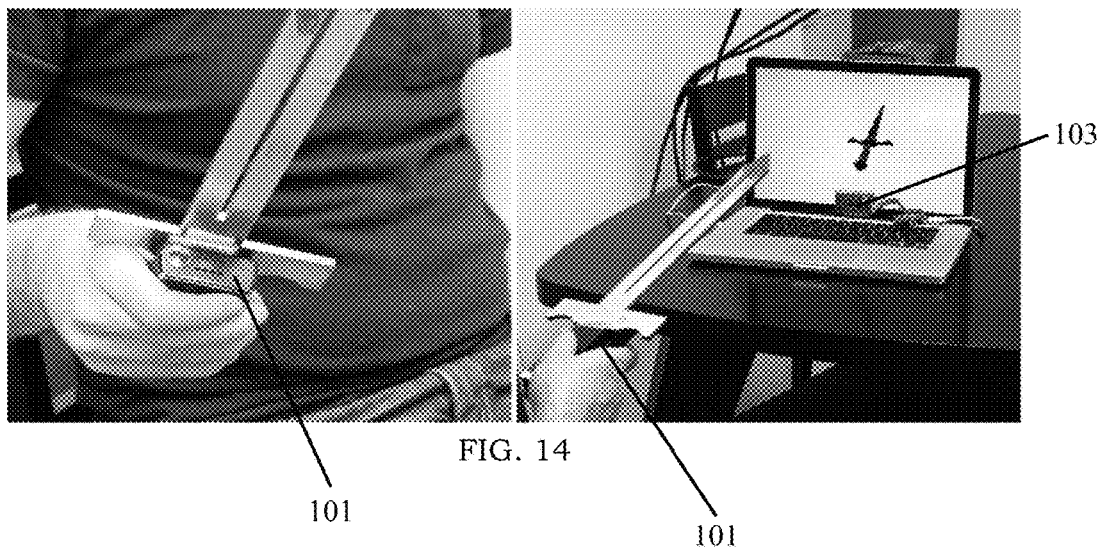
FIG. 14 shows tracking of a projector-augmented sword.

In another example, shown in FIG. 14, a sword prop is used, which was augmented with a projector 101. Onscreen, a virtual sword tracked with the user's rotational movements. One could imagine using this in a sword dueling game requiring high precision and fast reaction times.

Figure 15:
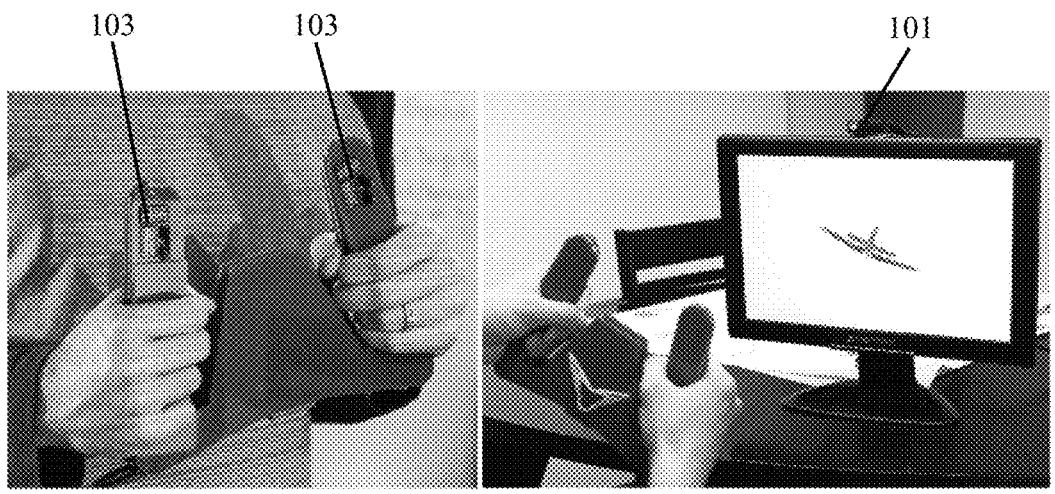
FIG. 15 presents an instrumented airplane yoke used to control a virtual plane.

In yet another example, shown in FIG. 15, an airplane yoke is fabricated with sensors 103 embedded in the upper grips of the yoke. Like its real-world counterparts, this yoke could control the pitch (nose up/down via pull/push inputs) and roll (left/right bank via left/right turn inputs) of a virtual plane.

Figure 16:
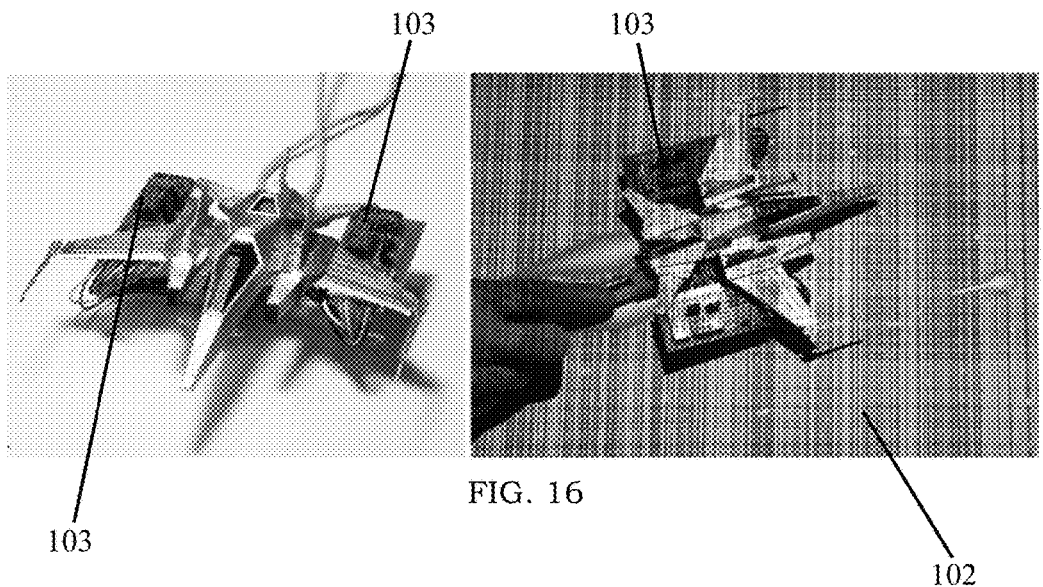
FIG. 16 is an image of an example augmented-reality application, with a spaceship model (Left) augmented with afterburner and weapon graphics (Right).

In yet another example application, a projected augmented reality application is created using a small spaceship model with fitted with two sensors 103. As shown in FIG. 16, the projector 101 is affixed above a play space, facing downwards, blanketing an area with a projected pattern 102 having two orthogonal m-sequences. Additionally, the dynamic projection capabilities are used to superimpose afterburner graphics and plasma weapon fire. The user can also steer the ship; a star field with parallax is rendered in the background to provide the illusion of directional travel.

Figure 17:
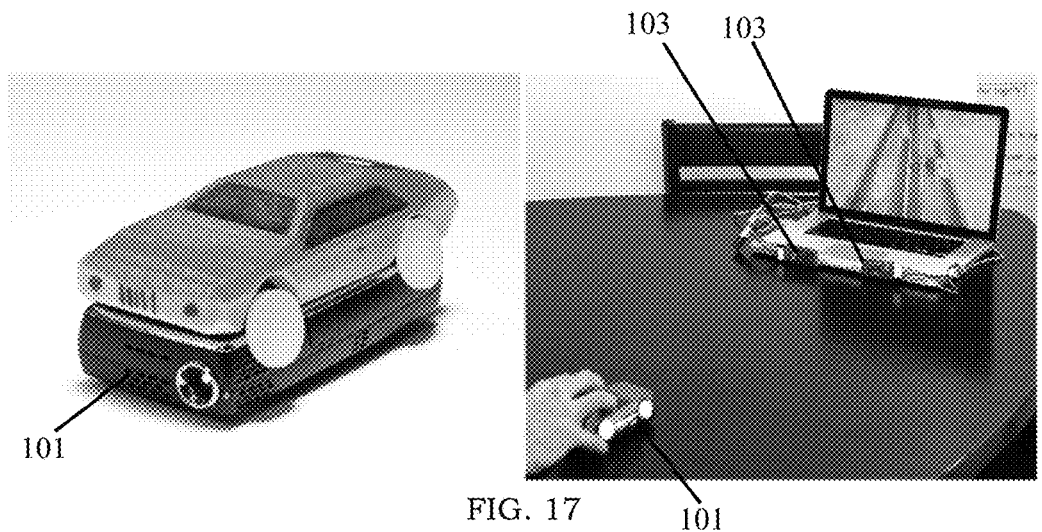
FIG. 17 is illustrates another example implementation according to one embodiment of the system.

In another example, shown in FIG. 17, a small car model sits atop the projector 101. This car could be translated on a table's surface in front of an augmented laptop running a simple racing game. The player's onscreen car mirrored the user's real-world movements. To capture this movement, two sensors 103 were placed on the front bezel of the laptop.

Figure 18:
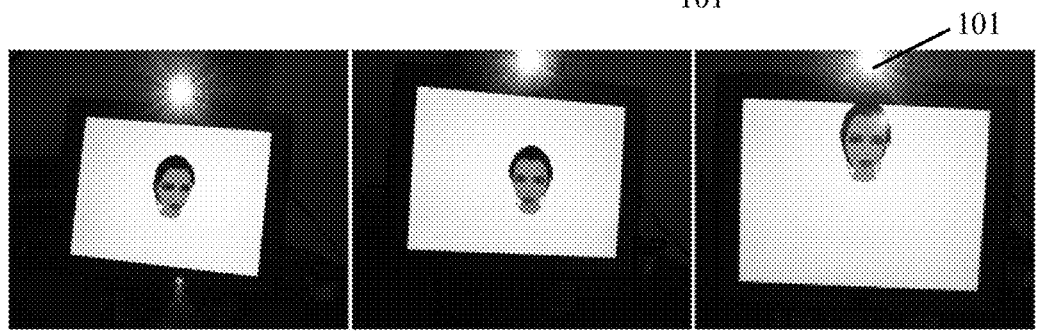
FIG. 18 shows the mimicking of a user's head through the use of six degrees of freedom tracking.

In another example, a four-sensor rig is created that could be worn on a user's head. This provided the three-dimension position and pose of the face. In this example, an avatar head, as shown in FIG. 18, is created that followed the user's position by rotating and translating. The avatar also mirrored the Z-rotation of the user's head (i.e., side-to-side tilting of the head). With the four-sensor pair rig used in this example, a user holding the projector 101 in their hand could use hand motions to manipulate a virtual interface.

In a final example, a projector 101 is affixed to the sleds of a toy helicopter. This model could be moved and rotated in three dimensions, which was reflected by an onscreen virtual helicopter. For example, in a flight simulator experience, this could be used to control a virtual helicopter (e.g., tilting forward for forward movement).

In these example applications and in other applications, if excessive ambient light is an issue, increases in projector brightness and optical sensor response can be used to improve the robustness of the system in varying lighting conditions. Moreover, denser patterns 102 with correspondingly higher m-values (for example, 100-sequences), combined with more intelligent m-sequence search approaches, can reduce the occurrence of false positives from the sensor 103. In one example, time-multiplexing, based on sensed proximity or other means, can be used to sense position if multiple projectors 101 overlap, enabling multi-user applications. In addition, two or more frequencies of infrared light are used to make the tracking patterns invisible to humans.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A method of tracking an object affixed to one of a projector and an optical sensor, comprising:
   generating an m-sequence comprised of a series of subsequences;
   projecting a structured light pattern from a projector, forming a projected field, wherein the structured light pattern is based on the m-sequence;
   positioning an optical sensor within the projected field to receive a portion of the structured light pattern,
      wherein the portion of the structured light pattern received by the sensor contains at least one subsequence of the series of subsequences;
   generating data with the optical sensor based on the received subsequence;
   thresholding the data from the optical sensor;
   transforming the thresholded data into a binary string, wherein transforming the thresholded data into a binary string comprises testing an offset and step size of the thresholded data to transform the thresholded data into a series of bits;
   determining if the binary string exists in the m-sequence; and
   calculating a position of the object based on a location of the received subsequence within the structured light pattern.

2. The method of claim 1, wherein projecting a structured light pattern from a projector further comprises:
   converting the m-sequence into the structured light pattern by emitting a first binary element as a dark line and a second binary element as a bright line.

3. The method of claim 1, wherein the m-sequence has a subsequence size of no more than 100 bits.

4. The method of claim 1, wherein testing an offset and step size of the thresholded data further comprises:
   running a search algorithm over all of a plurality of possible offset and step size combinations.

5. The method of claim 1, wherein generating an m-sequence comprises:
   creating a string of bits, each bit consisting of either a first binary element or a second binary element.

6. The method of claim 1, wherein each subsequence of the plurality of subsequences has a run of identical, consecutive bits no longer than three.

7. The method of claim 1, wherein each subsequence of the plurality of subsequences has at least one run of identical, consecutive bits of one.

8. The method of claim 7, wherein a first subsequence differs from a second subsequence in at least two locations.

9. The method of claim 1, further comprising:
   identifying the offset and step size;
   providing a position of the sensor with sub-pixel precision based on the calculated position, the offset, and the step size.

10. The method of claim 1, wherein determining if the binary string exists in the m-sequence comprises:
    testing the binary string against the m-sequence using a hashing algorithm and a table of hashed subsequences.

11. The method of claim 1, further comprising:
    projecting a second structured light pattern, wherein the second structured light pattern is based on a second m-sequence,
    wherein the second structured light pattern is projected orthogonally to the structured light pattern to enable motion tracking along two axes simultaneously.

12. The method of claim 1, further comprising:
    positioning at least one additional sensor in the projected field; and
    tracking a position of an object along multiple positional axes and multiple rotational axes.

13. A system for tracking an object using a structured light pattern, the system comprising:
    a projector for projecting a structured light pattern, the projector comprising:
       a light source for emitting light, and
       an image source for modulating the emitted light into the structured light pattern, wherein the structured light pattern is based on an m-sequence;
    a sensor located in an area illuminated by the structured light pattern, wherein the sensor generates a data signal based on a portion of the structured light pattern irradiating the sensor; and
    a processor in communication with the sensor, wherein the processor is configured to process the data signal received from the sensor to determine a location of the sensor based on the portion of the structured light pattern irradiating the sensor and the m-sequence, wherein the data signal is thresholded and transformed into a binary string by testing an offset and step size of the thresholded data signal to transform the thresholded data into a series of bits.

14. The system of claim 13,
    wherein the light source is a laser, and
    wherein the image source is a diffraction grating.

15. The system of claim 13, wherein the structured light pattern comprises a first series of lines corresponding to a first binary m-sequence.

16. The system of claim 15, wherein the structured light pattern further comprises a second series of lines oriented orthogonally to the first series of lines, the second series of lines corresponding to a second binary m-sequence.

17. The system of claim 16, further comprising:
    a second sensor positioned orthogonally to the first sensor, wherein the first sensor receives the first series of lines and the second sensor receives the second series of lines.

18. The system of claim 13, wherein the projector is a digital data projector capable of projecting a plurality of dynamically-generated structured light patterns.

19. The system of claim 13, wherein the image source is an optical film.

* * * * *